United States Patent
Kurui et al.

(10) Patent No.: US 12,326,411 B2
(45) Date of Patent: Jun. 10, 2025

(54) SENSOR AND SENSOR SYSTEM INCLUDING MULTIPLE DETECTION PORTIONS

(71) Applicant: KABUSHIKI KAISHA TOSHIBA, Tokyo (JP)

(72) Inventors: Yoshihiko Kurui, Chigasaki Kanagawa (JP); Hiroaki Yamazaki, Yokohama Kanagawa (JP); Yosuke Akimoto, Yokohama Kanagawa (JP); Ping Wang, Fujisawa Kanagawa (JP); Fumitaka Ishibashi, Sumida Tokyo (JP); Yumi Hayashi, Ayase Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 225 days.

(21) Appl. No.: 18/173,681

(22) Filed: Feb. 23, 2023

(65) Prior Publication Data
US 2024/0085360 A1   Mar. 14, 2024

(30) Foreign Application Priority Data
Sep. 14, 2022   (JP) ................................ 2022-146147

(51) Int. Cl.
*G01N 27/22*   (2006.01)

(52) U.S. Cl.
CPC ..... *G01N 27/228* (2013.01); *G01N 2027/222* (2013.01)

(58) Field of Classification Search
CPC ........... G01N 2027/222; G01N 27/128; G01N 27/226; G01N 27/228
See application file for complete search history.

(56) References Cited

U.S. PATENT DOCUMENTS

| | | | |
|---|---|---|---|
| 2002/0093860 A1 | 7/2002 | Kato et al. | |
| 2017/0343522 A1* | 11/2017 | Ikehashi | G01N 33/0036 |
| 2018/0003663 A1* | 1/2018 | Kameshiro | G01N 33/5438 |
| 2019/0086377 A1* | 3/2019 | Ikehashi | G01N 27/221 |

(Continued)

FOREIGN PATENT DOCUMENTS

| | | |
|---|---|---|
| JP | 2002-208294 | 7/2002 |
| JP | 2007-80513 A | 3/2007 |

(Continued)

*Primary Examiner* — Steven L Yeninas
(74) *Attorney, Agent, or Firm* — Finnegan, Henderson, Farabow, Garrett & Dunner, LLP

(57) ABSTRACT

According to one embodiment, a sensor includes a detection device and a circuit portion. The detection device includes a first detection portion and a second detection portion. The first detection portion includes a first detection element. The first detection element includes a first conductive member and a first detection member. The second detection portion includes a second detection element. The second detection element includes a second conductive member and a second detection member. The circuit portion is configured to execute a first detection portion operation for outputting a first detection result corresponding to a first detection value based on the first detection member when a first current is supplied to the first conductive member. In a case where a first evaluation value is not within a first range, the circuit portion is configured to execute a second detection portion operation by the second detection portion.

20 Claims, 11 Drawing Sheets

(56) References Cited

U.S. PATENT DOCUMENTS

| | | | |
|---|---|---|---|
| 2020/0080954 A1* | 3/2020 | Yamazaki | G01N 27/123 |
| 2021/0109071 A1* | 4/2021 | Hayashi | G01N 33/0073 |
| 2021/0182009 A1 | 6/2021 | Ohya | |
| 2021/0318282 A1* | 10/2021 | Akimoto | G01N 33/0009 |
| 2022/0011254 A1* | 1/2022 | Hayashi | G01N 27/227 |
| 2022/0082522 A1* | 3/2022 | Yamazaki | G01N 33/005 |
| 2022/0396471 A1* | 12/2022 | Yamazaki | G01N 27/128 |

FOREIGN PATENT DOCUMENTS

| | | | |
|---|---|---|---|
| JP | 2020-41893 A | 3/2020 | |
| JP | 2021-96291 A | 6/2021 | |

* cited by examiner

SENSOR AND SENSOR SYSTEM INCLUDING MULTIPLE DETECTION PORTIONS

CROSS-REFERENCE TO RELATED APPLICATIONS

This application is based upon and claims the benefit of priority from Japanese Patent Application No. 2022-146147, filed on Sep. 14, 2022; the entire contents of which are incorporated herein by reference.

FIELD

Embodiments described herein generally relate to a sensor and sensor system.

BACKGROUND

For example, there are sensors using MEMS (Micro Electro Mechanical Systems) elements. Stable detection is desired in the sensor.

DETAILED DESCRIPTION

Figure 1:
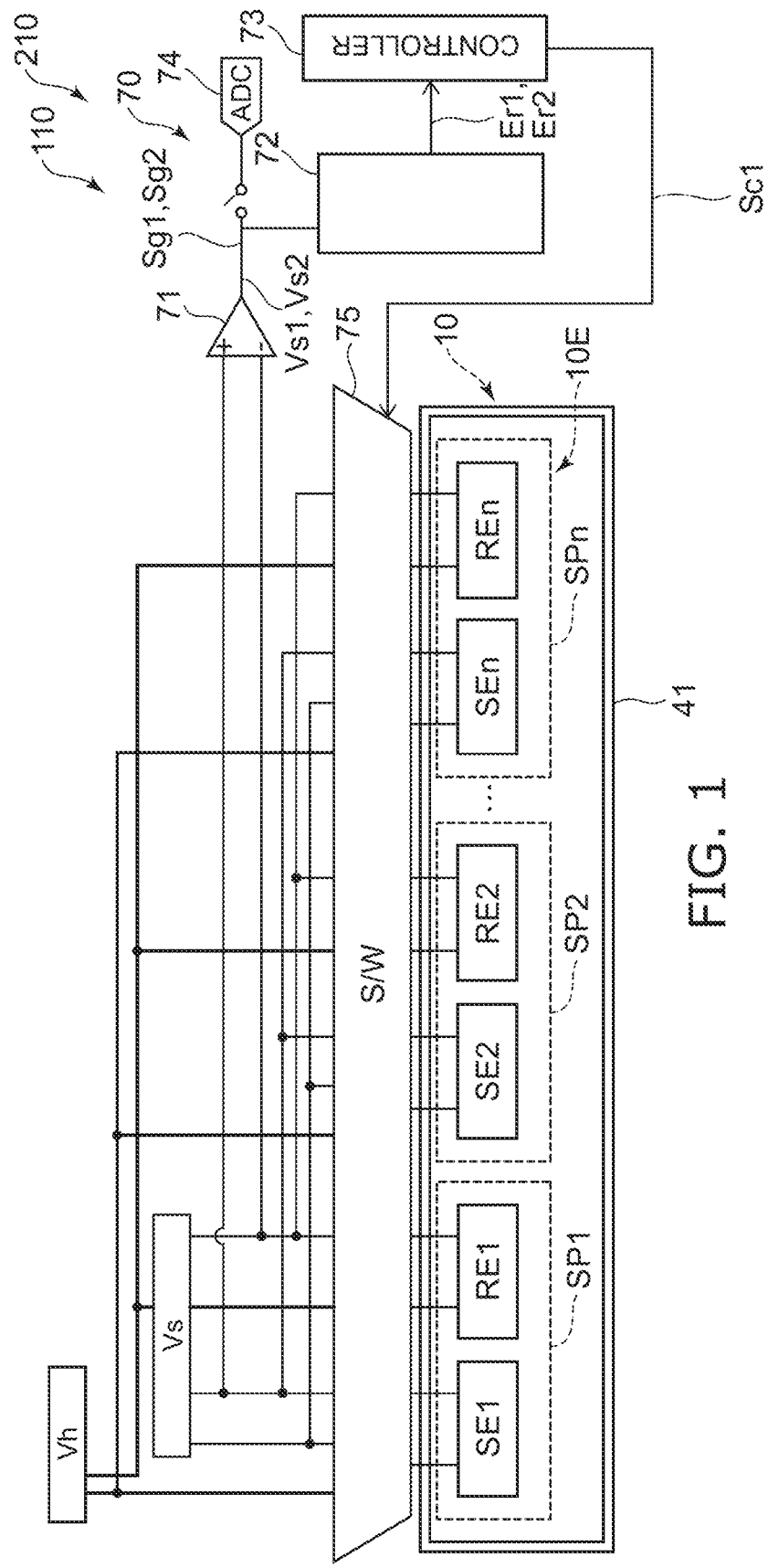
FIG. 1 is a schematic diagram illustrating a sensor according to a first embodiment.

According to one embodiment, a sensor includes a detection device and a circuit portion. The detection device includes a first detection portion and a second detection portion. The first detection portion includes a first detection element. The first detection element includes a first conductive member and a first detection member. The second detection portion includes a second detection element. The second detection element includes a second conductive member and a second detection member. The circuit portion is configured to execute a first detection portion operation for outputting a first detection result corresponding to a first detection value based on the first detection member when a first current is supplied to the first conductive member. In a case where a first evaluation value is not within a first range, the circuit portion is configured to execute a second detection portion operation by the second detection portion. The first evaluation value includes at least one of a value based on the first detection member when the first current is not supplied to the first conductive member or a value based on the first conductive member when the first current is substantially not supplied to the first conductive member.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic diagram illustrating a sensor according to the first embodiment.

Figure 2:
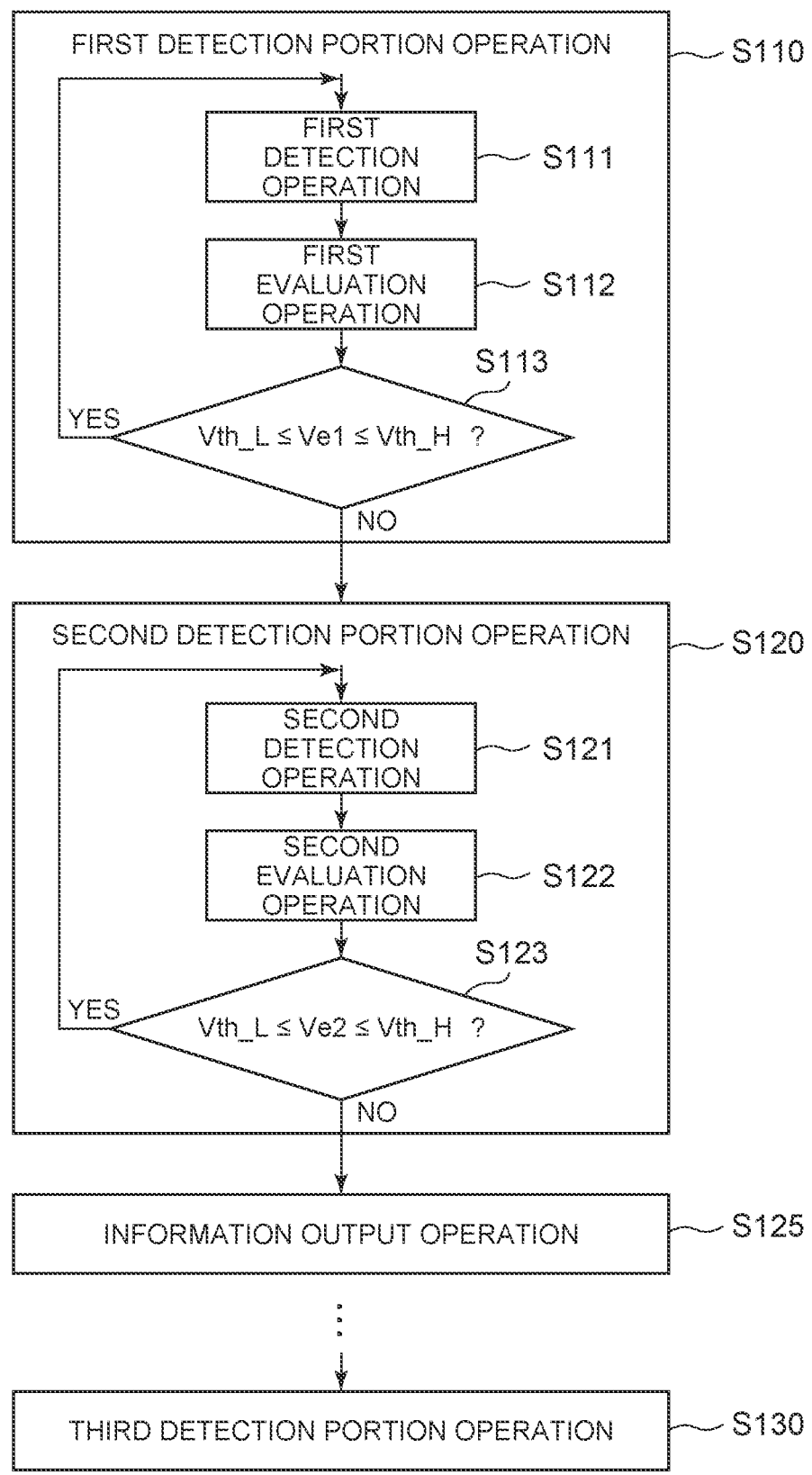
FIG. 2 is a flowchart illustrating the operation of the sensor according to the first embodiment.

FIG. 2 is a flowchart illustrating the operation of the sensor according to the first embodiment.

As shown in FIG. 1, a sensor 110 according to the embodiment includes a detection device 10 and a circuit portion 70. The detection device 10 includes a plurality of detection portions 10E. The plurality of detection portions 10E include a first detection portion SP1, a second detection portion SP2, an n-th detection portion SPn, and the like. "n" is an integer of 2 or greater.

As shown in FIG. 1, the first detection portion SP1 includes a first detection element SE1. The first detection element SE1 includes a first conductive member CM1 and a first detection member SM1 (see FIG. 5). As shown in FIG. 1, the second detection portion SP2 includes a second detection element SE2. The second detection element SE2 includes a second conductive member CM2 and a second detection member SM2 (see FIG. 7). As shown in FIG. 1, the n-th detection portion SPn includes an n-th detection element SEn. The n-th detection element SEn includes an n-th conductive member and an n-th detection member.

FIG. 2 illustrates an operation executed by the circuit portion 70. As shown in FIG. 2, the circuit portion 70 is configured to execute the first detection portion operation S110. In the first detection portion operation S110, the circuit portion 70 is configured to execute the first detection operation S111. In the first detection operation S111, the circuit portion 70 outputs a first detection result Sg1 (see FIG. 1) corresponding to a first detection value Vs1 (see FIG. 1) based on the first detection member SM1 when a first current is supplied to the first conductive member CM1. The first detection operation S111 corresponds to the detection operation of the detection object using the first detection portion SP1.

As shown in FIG. 2, the circuit portion 70 executes a first evaluation operation S112, which will be described later. By the first evaluation operation S112, the first evaluation value Ve1 is derived.

As shown in FIG. 2, the circuit portion 70 executes a first determination operation S113 for determining whether or not the first evaluation value Ve1 is within a first range. For example, a first evaluation value Ve1 is compared with a lower threshold value Vth_L and a higher threshold value Vth_H.

In the case where the first evaluation value Ve1 is not within the first range, the circuit portion 70 is configured to execute the second detection portion operation S120 by the second detection portion SP2. The case where the first evaluation value Ve1 is not within the first range corresponds to the case where the first detection portion SP1 is not normal. In this case, the detection operation is executed by switching from the first detection portion SP1 to the second detection portion SP2. As a result, detection by the detection portion 10E which is not normal is not executed. The detection is switched to the detection portion 10E being normal (second detection portion SP2). According to an embodiment, a sensor capable of stable detection can be provided.

For example, by supplying the first current to the first conductive member CM1, the characteristics (e.g., electrical resistance) of the first conductive member CM1 is changed. By supplying the first current to the first conductive member CM1, the temperature of the first detection member SM1 is increased. As a result, the characteristics of the first detection member SM1 is changed. The characteristic of the first detection member SM1 includes, for example, a rate of change of the electrical resistance of the first detection member SM1 by the detection object. The characteristic of the first detection member SM1 includes, for example, a rate of change in shape of the first detection member SM1 by the detection object. The characteristic of the first detection member SM1 includes, for example, a rate of change in volume of the first detection member SM1 by the detection object. Thus, there is a case where by supplying the first current to the first conductive member CM1, the characteristics of the first detection portion SP1 is changed and the first detection portion SP1 may have difficulty in normal detection. For example, a failure would occur in the first detection portion SP1. For example, the lifetime of the first detection portion SP1 would end. In the embodiment, detection by the detection portion 10E which is not normal is not executed. A sensor capable of stable detection can be provided.

In the first determination operation S113, if the first evaluation value Ve1 is within the first range, the circuit portion 70 is configured to further execute the first detection portion operation S110 (the first detection operation S111). For example, in the case where the first detection portion SP1 is normal, the first detection operation S111 by the first detection portion SP1 may be repeated.

The first evaluation value Ve1 may include, for example, a value (first detection member evaluation value) based on the first detection member SM1 when the first current is not supplied to the first conductive member CM1. The first evaluation value Ve1 may include, for example, a value based on the first conductive member CM1 when the first current is not substantially supplied to the first conductive member CM1 (the first conductive member evaluation value). The first evaluation value Ve1 may include, for example, at least one of the first detection member evaluation value and the first conductive member evaluation value.

In the embodiment, the detection object is detected by the detection value when the current is supplied to the conductive member. Normal and abnormal conditions of the first detection portion SP1 are detected by the evaluation value when no current is supplied to the conductive member.

As shown in FIG. 2, in the second detection portion operation S120, the circuit portion 70 is configured to execute the second detection operation S121. In the second detection operation S121, the circuit portion 70 is configured to output a second detection result Sg2 (see FIG. 1) corresponding to the second detection value Vs2 (see FIG. 1) based on the second detection member SM2 when the second current is supplied to the second conductive member CM2. The second detection operation S121 corresponds to the detection operation of the detection object using the second detection portion SP2. The second current may be the same as the first current.

As shown in FIG. 2, the circuit portion 70 executes a second evaluation operation S122, which will be described later. A second evaluation value Ve2 is derived by the second evaluation operation S122.

As shown in FIG. 2, the circuit portion 70 executes a second determination operation S123 of determining whether the second evaluation value Ve2 is within the second range. For example, the second evaluation value Ve2 is compared with the lower threshold value Vth_L and the higher threshold value Vth_H. The second range may be the same as the first range.

In the case where the second evaluation value Ve2 is not within the second range, the circuit portion 70 does not further execute the second detection portion operation S120. The case where the second evaluation value Ve2 is not within the second range corresponds to the case where the second detection portion SP2 is not normal. In this case, the circuit portion 70 terminates the detection operation by the second detection portion SP2, for example. As a result, detection by the detection portion 10E which is not normal is not executed. According to the embodiment, a sensor capable of stable detection can be provided.

As shown in FIG. 2, in the case where the second evaluation value Ve2 is not within the second range, the circuit portion 70 may execute information output operation S125 of outputting information including warning.

As shown in FIG. 2, the circuit portion 70 may be configured to execute a third detection operation S130 by a third detection portion in the case where the second evaluation value Ve2 is not within the second range. The third detection portion is another one of the plurality of detection portions 10E. The third detection portion may be, for example, the n-th detection portion SPn. Stable detection is possible.

The circuit portion 70 may further execute the second detection portion operation S120 when the second evaluation value Ve2 is within the second range in the second determination operation S123. For example, when the second detection portion SP2 is normal, the second detection operation S121 by the second detection portion SP2 may be repeatedly executed.

The second evaluation value Ve2 may include, for example, a value (second detection member evaluation value) based on the second detection member SM2 when the second current is not supplied to the second conductive member CM2. The second evaluation value Ve2 may include, for example, a value (second conductive member evaluation value) based on the second conductive member CM2 when the second current is not substantially supplied to the second conductive member CM2. The second evaluation value Ve2 may include, for example, at least one of the second detection member evaluation value and the second conductive member evaluation value.

As shown in FIG. 1, circuit portion 70 may include a switch circuit 75. The switch circuit 75 is configured to switch between supplying the first current to the first conductive member CM1 and not supplying the first current to the first conductive member CM1. The switch circuit 75 is configured to switch between supplying the second current to the second conductive member CM2 and not supplying the second current to the second conductive member CM2.

As shown in FIG. 1, the circuit portion 70 may further include a detection circuit 71. The detection circuit 71 is configured to output the first detection result Sg1. As already explained, the first detection result Sg1 is the value based on the first detection member SM1 when the first current is supplied to the first conductive member CM1. The detection circuit 71 is configured to output the second detection result Sg2. As already explained, the second detection result Sg2 is the value based on the second detection member SM2 when the second current is supplied to the second conductive member CM2.

In this example, the circuit portion 70 includes an AD converter 74. The first detection result Sg1 and the second detection result Sg2 are AD-converted. The output of the AD converter 74 may be used as the detection result of the detection object.

As shown in FIG. 1, circuit portion 70 may further include an evaluation circuit 72. The evaluation circuit 72 is configured to output a first evaluation result Er1 regarding whether the first evaluation value Ve1 is within the first range. The evaluation circuit 72 is configured to output a second evaluation result Er2 regarding whether the second evaluation value Ve2 is within the second range.

The evaluation circuit 72 is, for example, a fault detection circuit. The evaluation circuit 72 may include, for example, a comparator. The evaluation circuit 72 may include, for example, an AD converter.

As shown in FIG. 1, the circuit portion 70 may further include a control circuit 73. The control circuit 73 is configured to control the switch circuit 75. For example, the first evaluation result Er1 is supplied to the control circuit 73. For example, the second evaluation result Er2 is supplied to the control circuit 73. The control circuit 73 supplies the switch circuit 75 with the first control signal Sc1 based on these evaluation results. The switch circuit 75 is controlled by the first control signal Sc1.

As shown in FIG. 1, a conductive member power source Vh may be provided. The first current and the second current are supplied by the conductive member power source Vh. As shown in FIG. 1, a detection power source Vs may be provided. The first detection value Vs1, a second detection value Vs2, a first detection member evaluation value, and a second detection member evaluation value are obtained from the detection power source Vs. At least one of the conductive member power source Vh or the detection power source Vs may be included in the circuit portion 70.

As shown in FIG. 1, in this example, the first detection portion SP1 includes a first reference element RE1 in addition to the first detection element SE1. The second detection portion SP2 includes a second reference element RE2 in addition to the second detection element SE2. The n-th detection portion SPn includes an n-th reference element REn in addition to the n-th detection element SEn. By detecting the characteristics of the detection element and the characteristics of the reference element, the detection object can be detected with high accuracy.

As shown in FIG. 1, the plurality of detection portion 10E (first detection portion SP1, second detection portion SP2, n-th detection portion SPn, etc.) may be provided on a base body 41.

Figure 3:
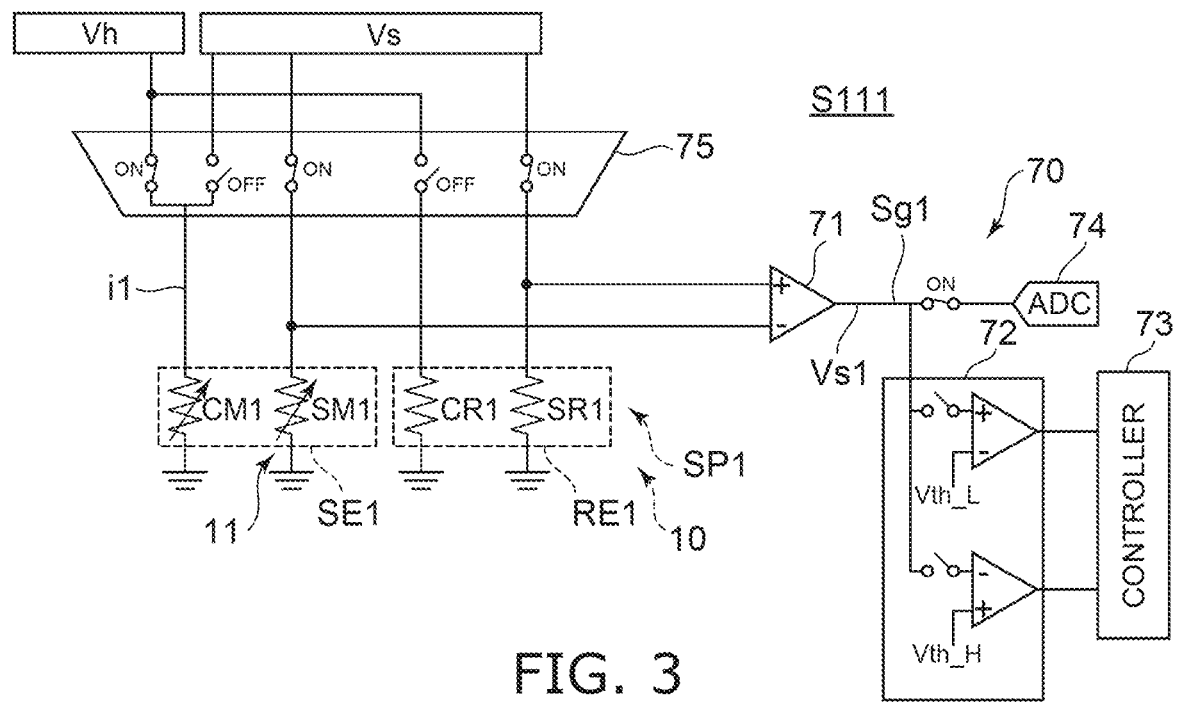
FIG. 3 is a schematic diagram illustrating a part of the sensor according to the first embodiment.

FIG. 3 is a schematic diagram illustrating a part of the sensor according to the first embodiment.

As shown in FIG. 3, the first detection element SE1 includes the first conductive member CM1 and the first detection member SM1. In this example, the first detection member SM1 includes a first resistance member 11. In this case, the first detection result Sg1 is a first electrical resistance of the first resistance member 11.

As shown in FIG. 3, the first detection portion SP1 includes the first reference element RE1. The first reference element RE1 includes a first reference resistance member SR1. In this example, the first reference element RE1 includes a first reference conductive member CR1. The configuration of the first reference element RE1 is the same as the configuration of the first detection element SE1. As a result, the reference operation with higher accuracy can be performed.

FIG. 3 corresponds to the first detection operation S111. In the first detection operation S111, the first current i1 based on the conductive member power source Vh is supplied to the first conductive member CM1. In the first detection operation S111, the conductive member power source Vh is not connected to the first reference conductive member CR1. In the first detection operation S111, the first current i1 is not supplied to the first reference conductive member CR1. This operation is performed by the switch circuit 75.

By the operation of the switch circuit 75, the detection power source Vs is connected to the first resistance member 11 and the first reference resistance member SR1. The potential of the first resistance member 11 and the potential of the first reference resistance member SR1 are supplied to the detection circuit 71. The detection circuit 71 is, for example, a differential amplifier. The detection circuit 71 outputs a signal corresponding to the difference between these potentials as the first detection result Sg1.

The first detection value Vs1 is based on a difference between the first electrical resistance of the first resistance member 11 when the first current i1 is supplied to the first conductive member CM1 and a first reference electrical resistance of the first reference resistance member SR1.

Figure 4:
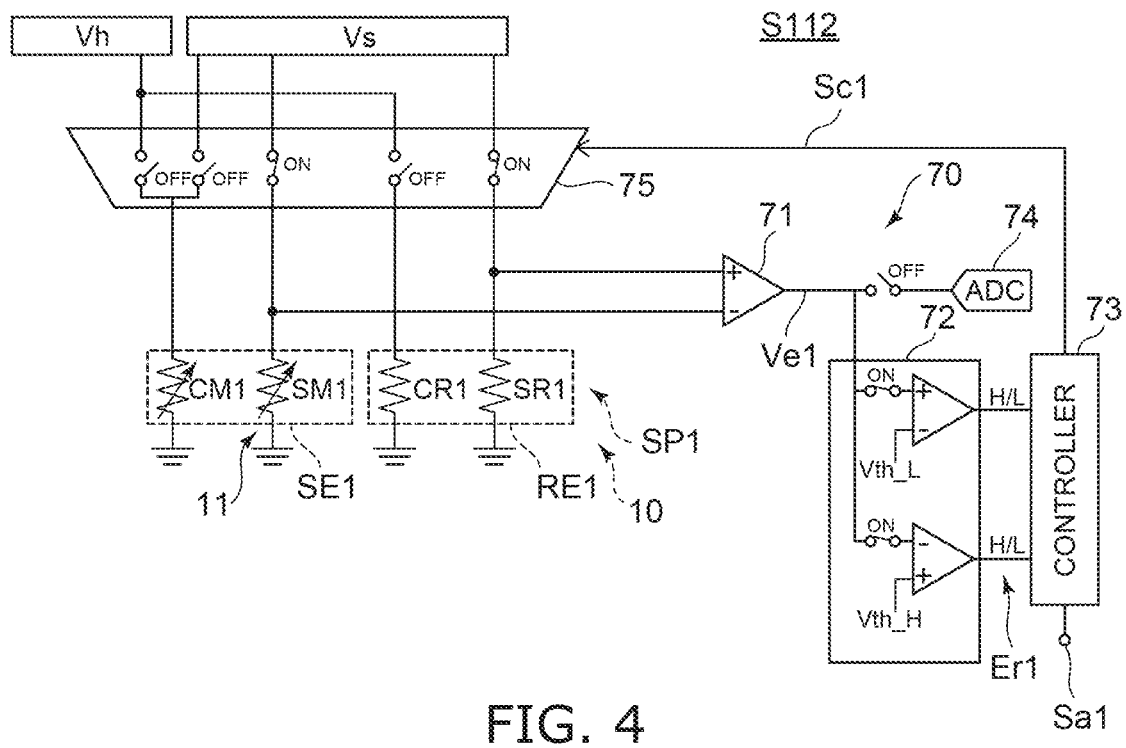
FIG. 4 is a schematic diagram illustrating a part of the sensor according to the first embodiment.

FIG. 4 is a schematic diagram illustrating a part of the sensor according to the first embodiment.

FIG. 4 corresponds to the first evaluation operation S112. In the first evaluation operation S112, the conductive member power source Vh is not connected to the first conductive member CM1 (and the first reference conductive member CR1). In the first evaluation operation S112, the first current i1 is not supplied to the first conductive member CM1. This operation is performed by the switch circuit 75.

The detection power source Vs is connected to the first resistance member 11 and the first reference resistance member SR1. The potential of the first resistance member 11 and the potential of the first reference resistance member SR1 are supplied to the detection circuit 71. The detection circuit 71 is, for example, a differential amplifier. A signal corresponding to the difference between these potentials are output from the detection circuit 71. This signal corresponds to the first evaluation value Ve1.

As shown in FIG. 4, the evaluation circuit 72 compares the first evaluation value Ve1 with the lower threshold Vth_L and the higher threshold Vth_H. The evaluation circuit 72 outputs the first evaluation result Er1.

The control circuit 73 supplies the switch circuit 75 with the first control signal Sc1 based on the first evaluation result Er1. The switch circuit 75 is controlled by the first control signal Sc1. The control circuit 73 may output an information signal Sa1 including a warning.

Figure 5:
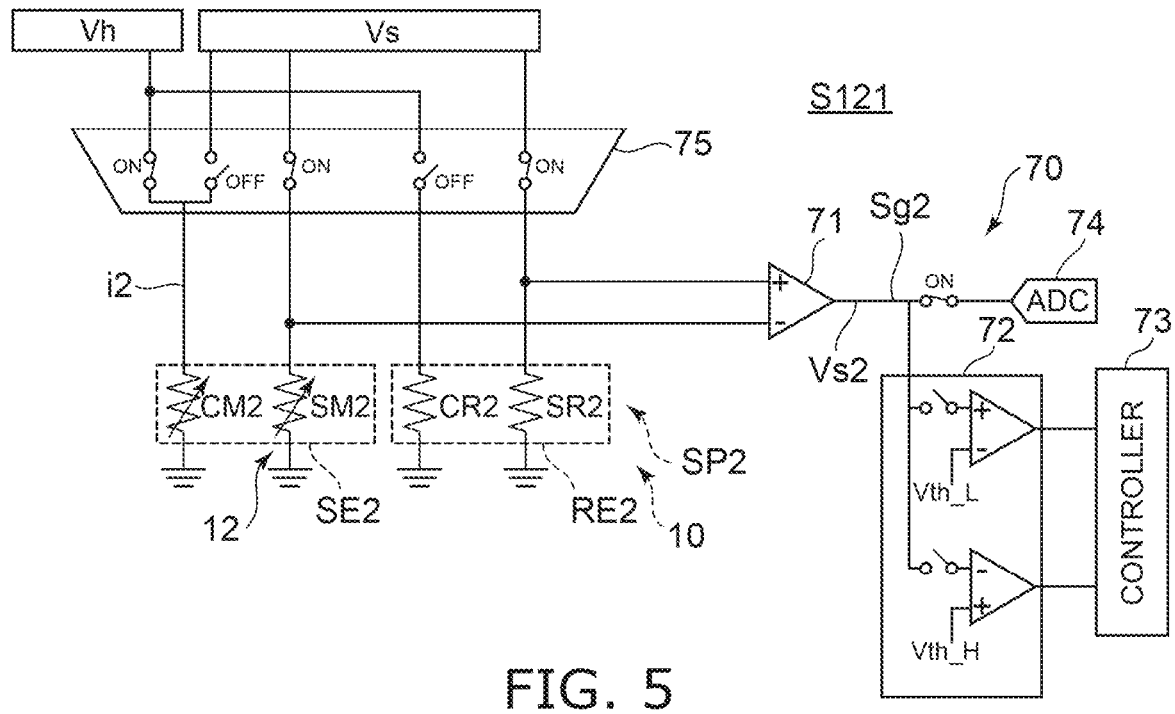
FIG. 5 is a schematic diagram illustrating a part of the sensor according to the first embodiment.

FIG. 5 is a schematic diagram illustrating a part of the sensor according to the first embodiment.

As shown in FIG. 5, the second detection element SE2 includes the second conductive member CM2 and the second detection member SM2. In this example, the second detection member SM2 includes a second resistance member 12. In this case, the second detection result Sg2 is a second electrical resistance of the second resistance member 12.

As shown in FIG. 5, the second detection portion SP2 includes the second reference element RE2. The second reference element RE2 includes a second reference resistance member SR2. In this example, the second reference element RE2 includes a second reference conductive member CR2.

FIG. 5 corresponds to the second detection operation S121. In the second detection operation S121, the second current i2 based on the conductive member power source Vh is supplied to the second conductive member CM2. In the second detection operation S121, the conductive member power source Vh is not connected to the second reference conductive member CR2. This operation is performed by the switch circuit 75.

By the operation of the switch circuit 75, the detection power source Vs is connected to the second resistance member 12 and the second reference resistance member SR2. The potential of the second resistance member 12 and the potential of the second reference resistance member SR2 are supplied to the detection circuit 71. The detection circuit 71 outputs a signal corresponding to the difference between these potentials as the second detection result Sg2.

The second detection value Vs2 is based on a difference between the second electrical resistance of the second resistance member 12 when the second current i2 is supplied to the second conductive member CM2 and a second reference electrical resistance of the second reference resistance member SR2.

Figure 6:
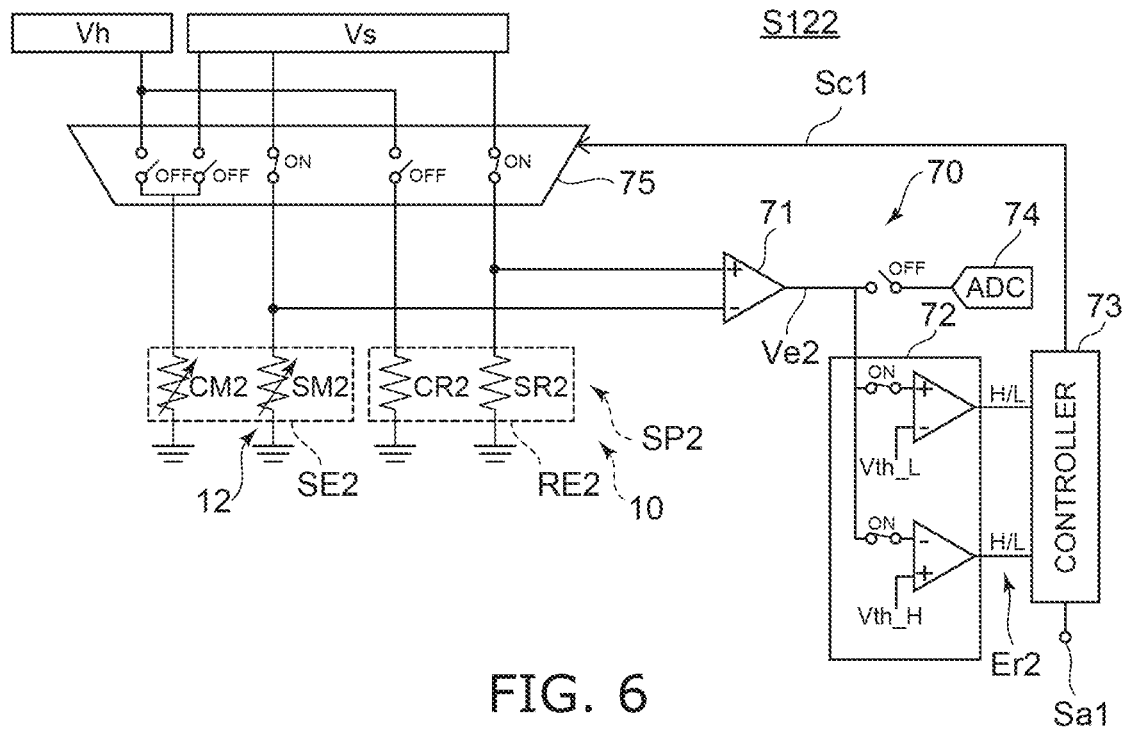
FIG. 6 is a schematic diagram illustrating a part of the sensor according to the first embodiment.

FIG. 6 is a schematic diagram illustrating a part of the sensor according to the first embodiment.

FIG. 6 corresponds to the second evaluation operation S122. In the second evaluation operation S122, the conductive member power source Vh is not connected to the second conductive member CM2 (and the second reference conductive member CR2). In the second evaluation operation S122, the second current i2 is not supplied to the second conductive member CM2. This operation is performed by the switch circuit 75.

The detection power source Vs is connected to the second resistance member 12 and the second reference resistance member SR2. The potential of the second resistance member 12 and the potential of the second reference resistance member SR2 are supplied to the detection circuit 71. A signal corresponding to the difference between these potentials is output from the detection circuit 71. This signal corresponds to the second evaluation value Ve2.

As shown in FIG. 6, the evaluation circuit 72 compares the second evaluation value Ve2 with the lower threshold value Vth_L and the higher threshold value Vth_H. The second evaluation result Er2 is output from the evaluation circuit 72.

The control circuit 73 supplies the switch circuit 75 with the first control signal Sc1 based on the second evaluation result Er2. The switch circuit 75 is controlled by the first control signal Sc1. The control circuit 73 may output the information Sal including the warning.

In the embodiments, the first reference conductive member CR1 may be omitted. In the embodiments, the second reference conductive member CR2 may be omitted.

Figure 7:
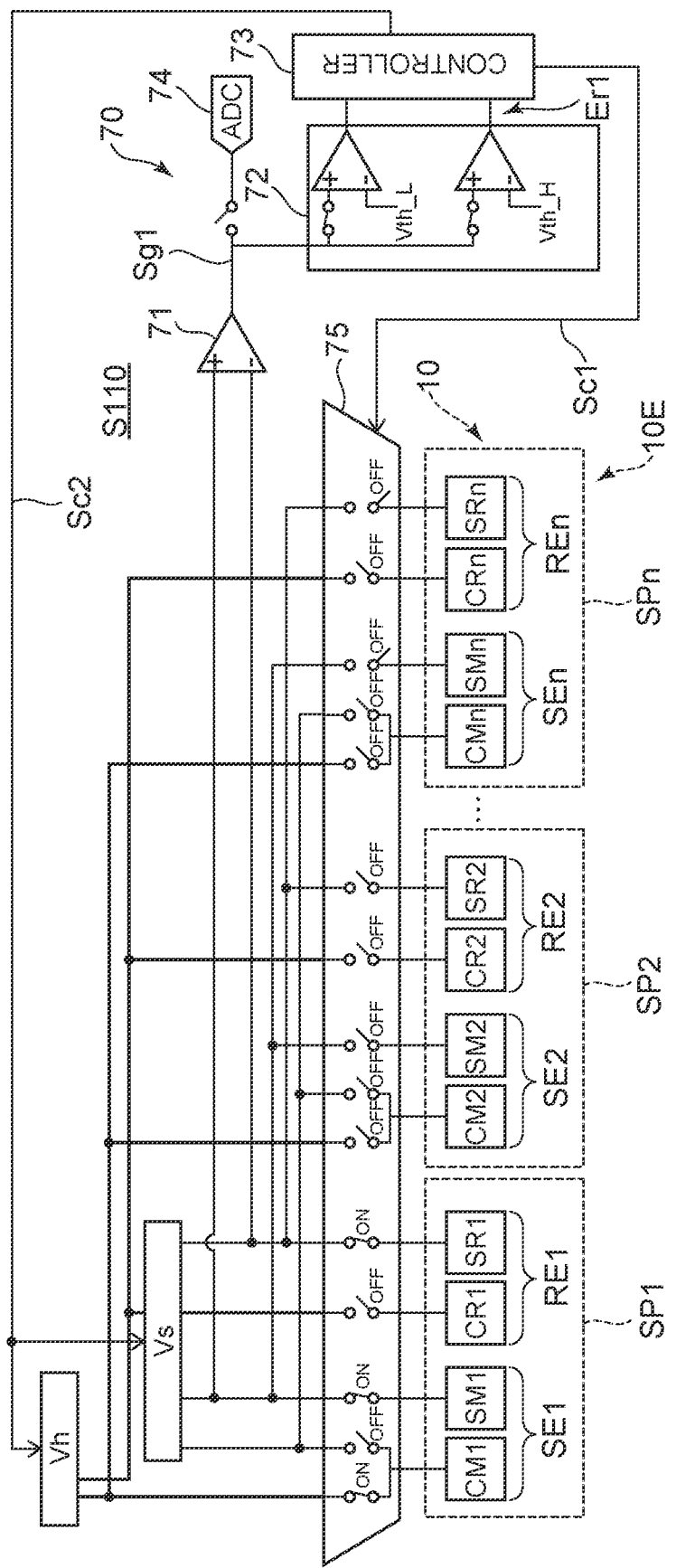
FIG. 7 is a schematic diagram illustrating the operation of the sensor according to the first embodiment.
Figure 8:
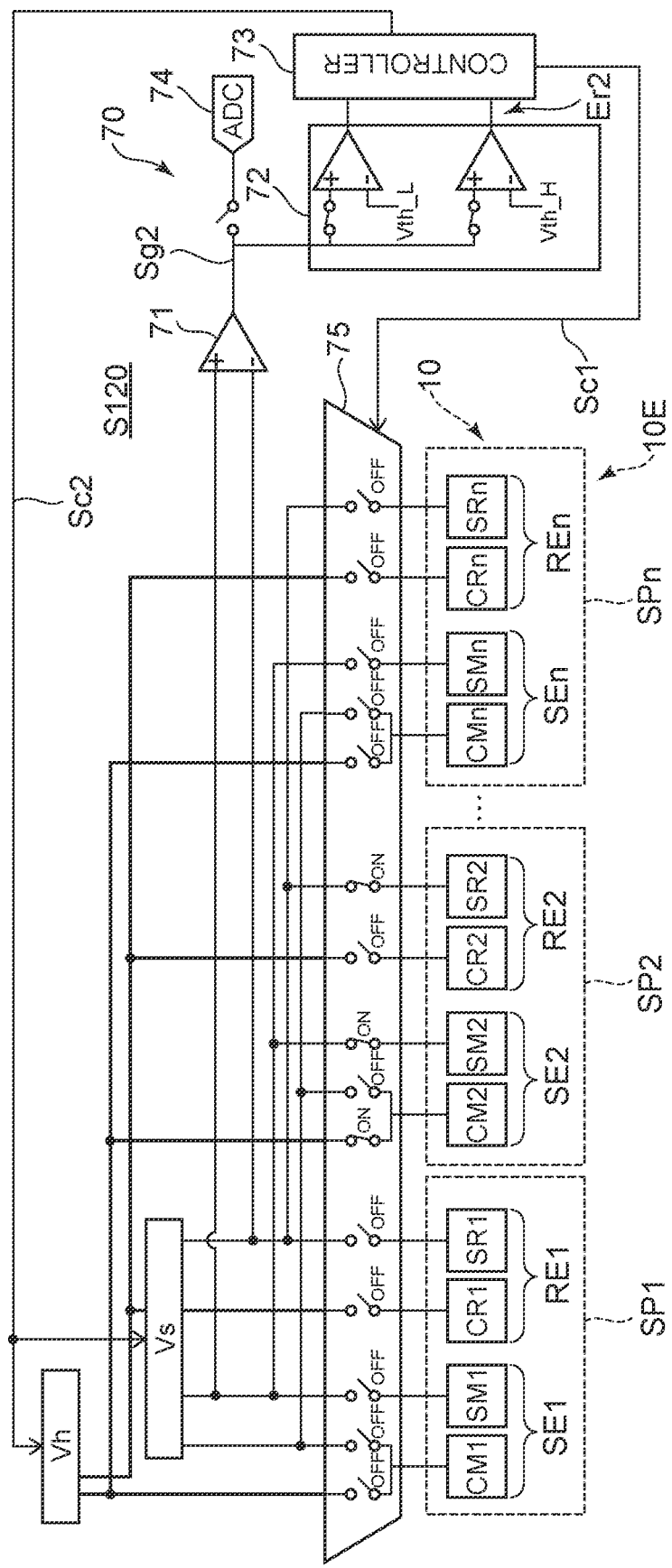
FIG. 8 is a schematic diagram illustrating the operation of the sensor according to the first embodiment.

FIGS. 7 and 8 are schematic diagrams illustrating the operation of the sensor according to the first embodiment.

FIG. 7 corresponds to the first detection portion operation S110. FIG. 8 corresponds to the second detection portion operation S120. The above operations may be sequentially performed for three or more detection portions 10E.

As shown in FIGS. 7 and 8, the control circuit 73 may be configured to supply a second control signal Sc2 to at least one of the conductive member power source Vh or the detection power source Vs. The second control signal Sc2 is based on at least one of the first evaluation result Er1 or the second evaluation result Er2.

For example, when the first detection portion operation S110 is further performed, the circuit portion 70 may adjust at least one of the first current i1 or the deriving condition of the first detection value Vs1 based on the first evaluation value Ve1. The first current i1 may be adjusted, for example, by adjusting the conductive member power source Vh. The condition for deriving the first detection value Vs1 may be adjusted by adjusting the detection power source Vs.

For example, when the second detection portion operation S120 is further performed, the circuit portion 70 may adjust at least one of the second current i2 or the derivation condition of the second detection value Vs2 based on the second evaluation value Ve2. The second current i2 may be adjusted, for example, by adjusting the conductive member power source Vh. The condition for deriving the second detection value Vs2 may be adjusted by adjusting the detection power source Vs.

Examples of the detection device 10 are described below.

Figure 9:
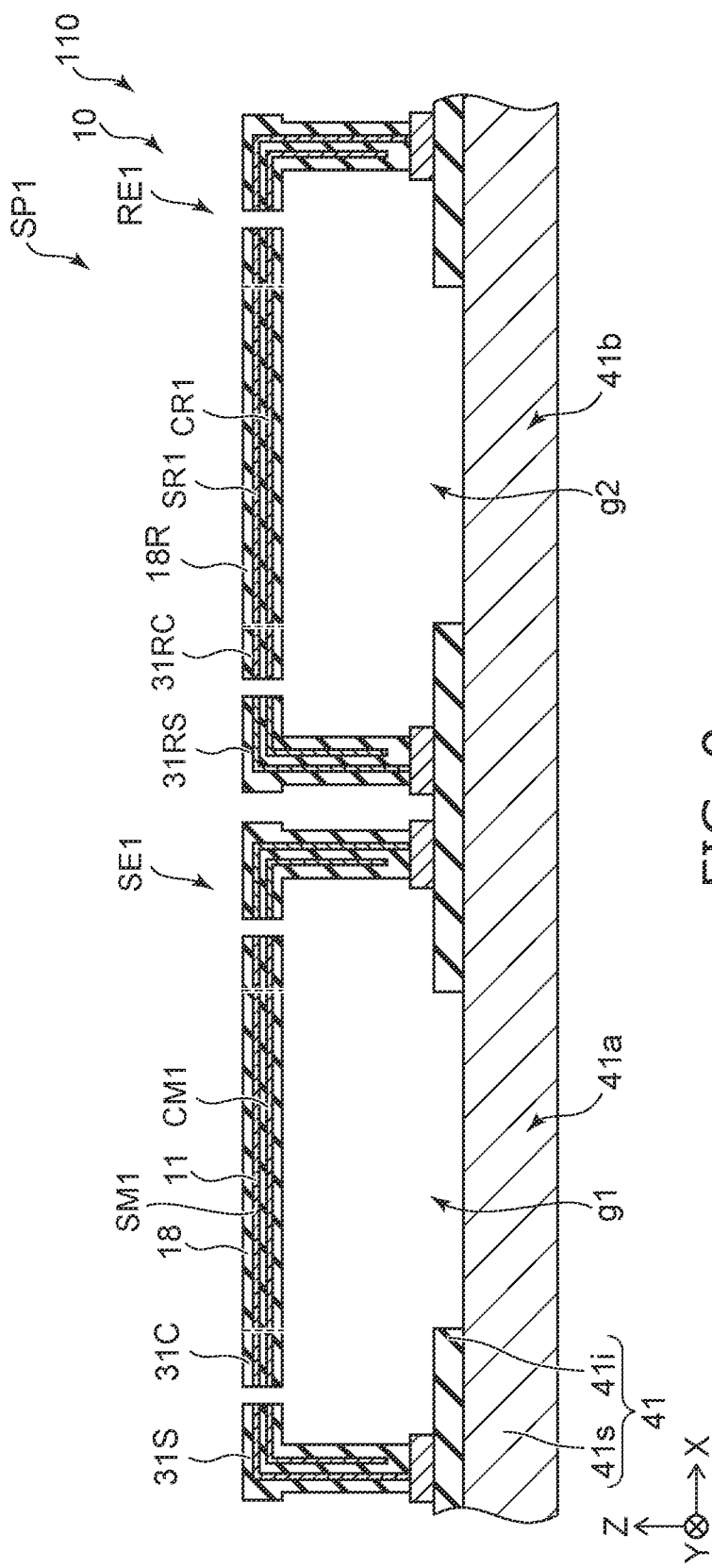
FIG. 9 is a schematic cross-sectional view illustrating a part of the sensor according to the first embodiment.
Figure 10A:
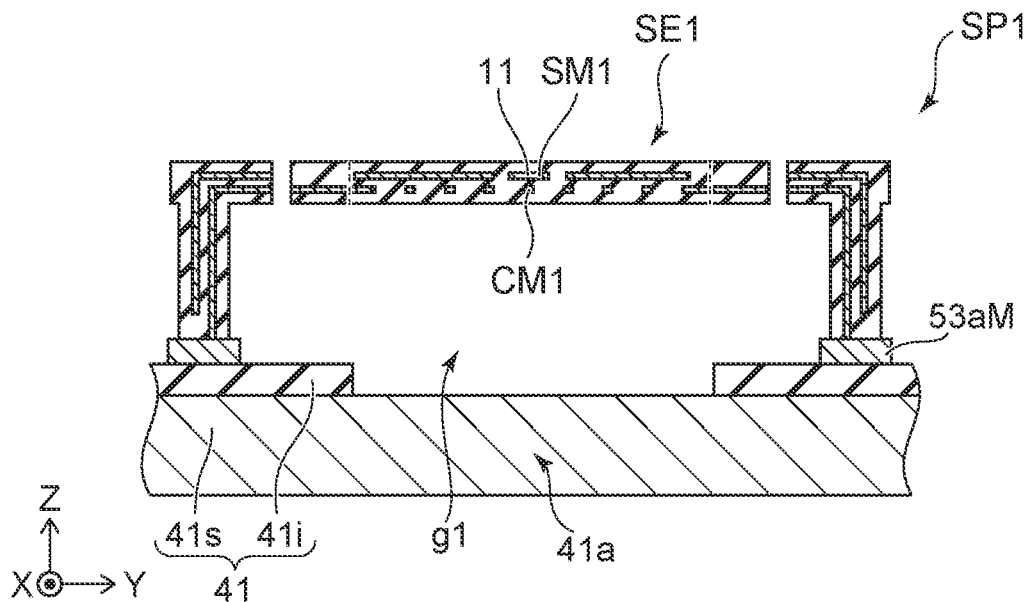
FIGS. 10A and 10B are schematic cross-sectional views illustrating a part of the sensor according to the first embodiment.
Figure 10B:
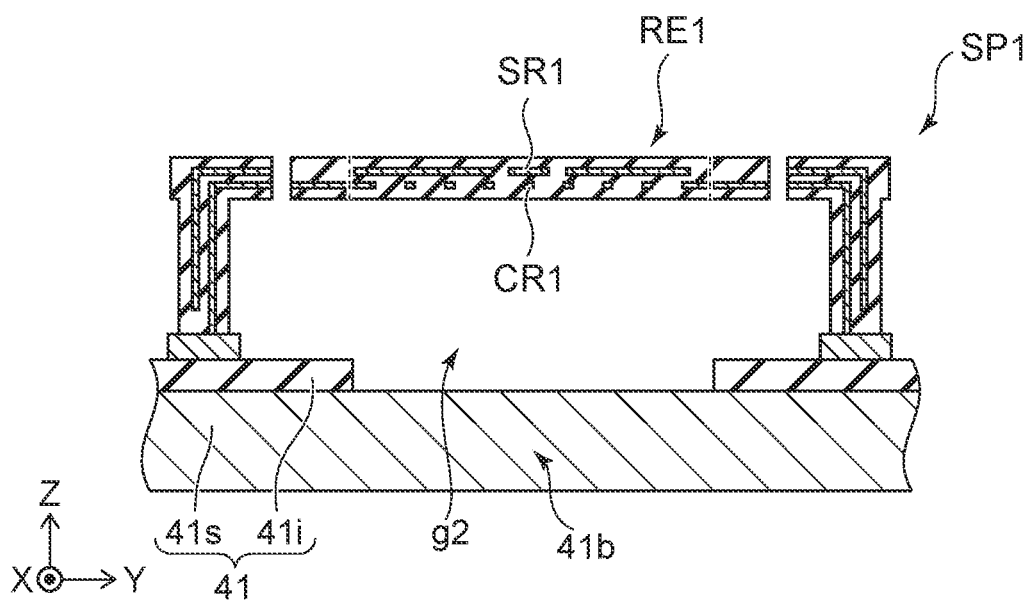

FIGS. 9, 10A and 10B are schematic cross-sectional views illustrating a part of the sensor according to the first embodiment.

Figure 11:
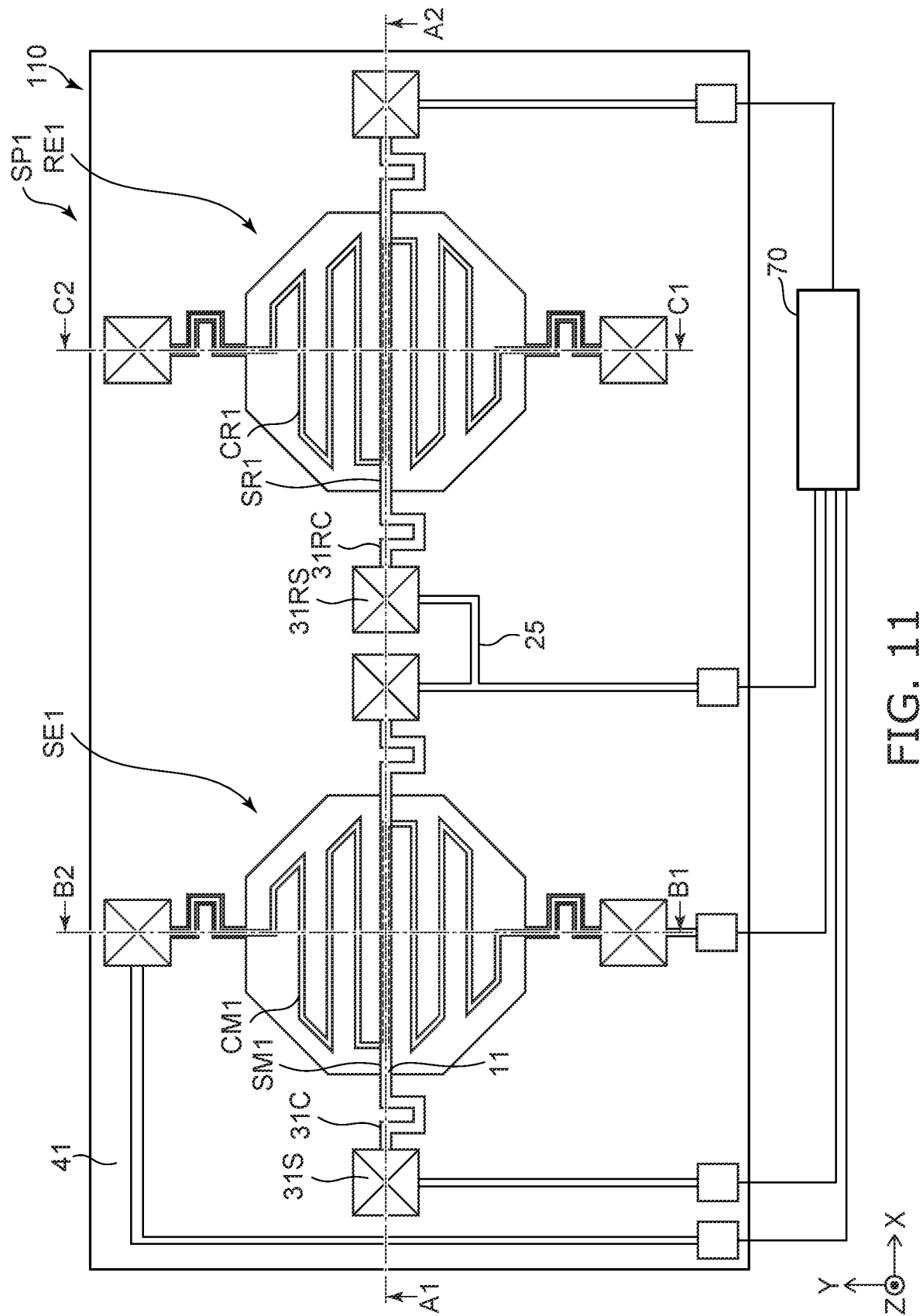
FIG. 11 is a schematic plan view illustrating a part of the sensor according to the first embodiment.

FIG. 11 is a schematic plan view illustrating a part of the sensor according to the first embodiment.

FIG. 9 is a cross-sectional view taken along the line A1-A2 of FIG. 11. FIG. 10A is a cross-sectional view along the line B1-B2 of FIG. 11. FIG. 10B is a cross-sectional view taken along the line C1-C2 of FIG. 11. These figures show an example of the first detection portion SP1.

As shown in FIGS. 9, 10A, 10B and 11, the detection device 10 includes the first detection portion SP1. As already explained, the first detection portion SP1 includes the first detection element SE1 and the first reference element RE1. The first detection element SE1 includes the first conductive member CM1 and the first detection member SM1. In this example, the first reference element RE1 includes the first reference resistance member SR1 and the first reference conductive member CR1. In this example, the first detection member SM1 includes the first resistance member 11.

In this example, the first detection portion SP1 includes the base body 41. The base body 41 includes a first base region 41a and a second base region 41b. The first detection element SE1 is provided at the first base region 41a. The first reference element RE1 is provided at the second base region 41b.

In this example, the first base region 41a is continuous with the second base region 41b. The boundary between the first base region 41a and the second base region 41b may be clear or unclear. The first base region 41a may be separated from the second base region 41b.

In this example, the base body 41 includes a substrate 41s and an insulating film 41i. The substrate 41s may be, for example, a semiconductor substrate (for example, a silicon substrate). The substrate 41s may include, for example, a semiconductor circuit. The substrate 41s may include connecting members such as via electrodes.

A direction from the first base region 41a to the first detection element SE1 is defined as a Z-axis direction. One direction perpendicular to the Z-axis direction is defined as an X-axis direction. The direction perpendicular to the Z-axis direction and the X-axis direction is defined as a Y-axis direction. The direction from the second base region 41b to the first reference element RE1 is along the Z-axis direction.

In this example, the first detection portion SP1 further includes a first connection portion 31C and a first support portion 31S. The first support portion 31S is fixed to the base body 41. A part of the first connection portion 31C is supported by the first support portion 31S. Another part of the first connection portion 31C supports the first detection element SE1 to be away from the first base region 41a. A first gap g1 is provided between the first base region 41a and the first detection element SE1.

In this example, the first detection portion SP1 includes a first reference connection portion 31RC and a first reference support portion 31RS. The first reference support portion 31RS is fixed to the base body 41. A part of the first reference connection portion 31RC is supported by the first reference support portion 31RS. Another part of the first reference connection portion 31RC supports the first reference element RE1 to be away from the second base region 41b. A second gap g2 is provided between the second base region 41b and the first reference element RE1.

By the first detection element SE1 and the first reference element RE1 being supported to be away from the base body 41, conduction of heat from these elements via the base body 41 is suppressed. As a result, stable detection of the detection object with high sensitivity can be performed.

As shown in FIG. 9, the first detection element SE1 may include a first insulating portion 18. The first reference element RE1 may include a first reference insulating portion 18R. At least part of the first insulating portion 18 is provided around the first resistance member 11 (first detection member SM1) and the first conductive member CM1. At least part of the first reference insulating portion 18R is provided around the first reference resistance member SR1 and the first reference conductive member CR1.

Figure 12A:
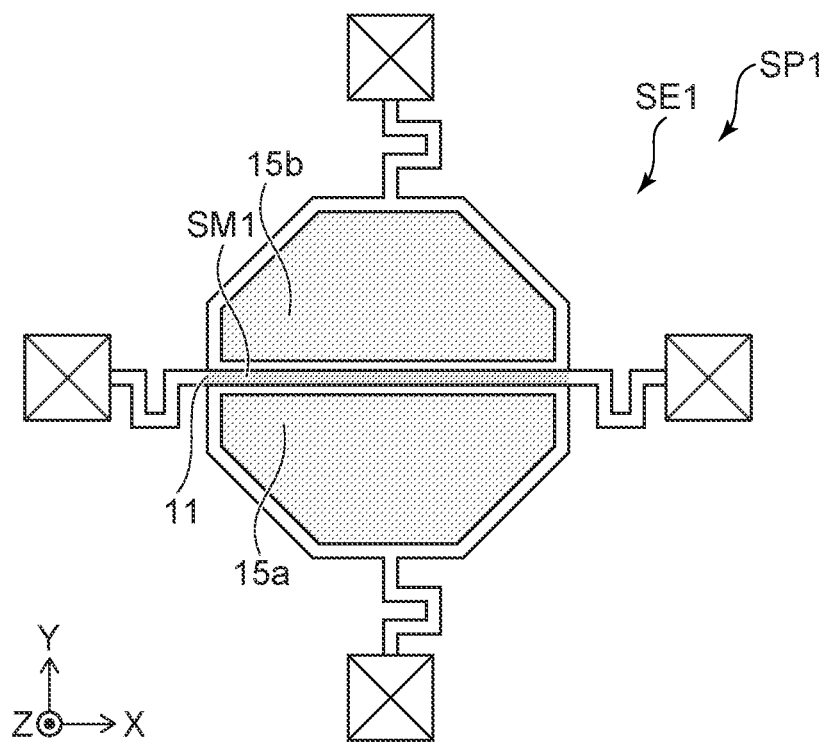
FIGS. 12A and 12B are schematic plan views illustrating a part of the sensor according to the first embodiment.
Figure 12B:
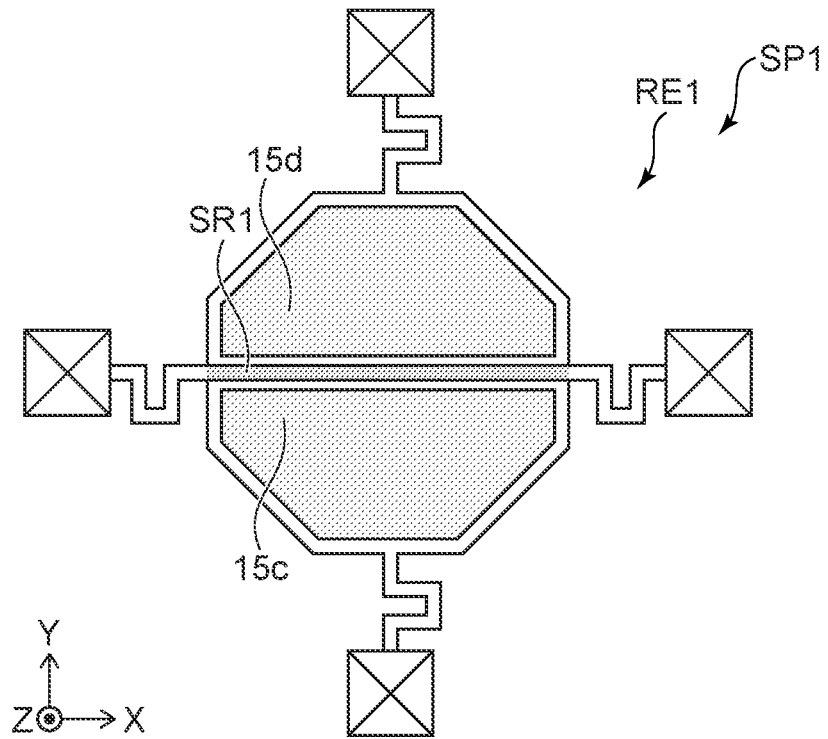

FIGS. 12A and 12B are schematic plan views illustrating a part of the sensor according to the first embodiment.

These figures are plan views relating to a layer including the first detection member SM1 (first resistance member 11) and the first reference resistance member SR1. As shown in FIG. 12 A, the first detection element SE1 may include a first layer 15a and a second layer 15b. The first layer 15a and the second layer 15b have the same material and thickness as those of the first resistance member 11. The first resistance member 11 is provided between the first layer 15a and the second layer 15b. By providing these layers, warpage (deformation) of the first detection element SE1 is suppressed.

As shown in FIG. 12B, the first reference element RE1 may include a third layer 15c and a fourth layer 15d. The third layer 15c and the fourth layer 15d have the same material and thickness as those of the first reference resistance member SR1. The first reference resistance member SR1 is provided between the third layer 15c and the fourth layer 15d. Warping (deformation) of the first reference resistance member SR1 is suppressed by providing these layers.

Thus, the first detection portion SP1 may include the base body 41 and the first support portion 31S fixed to the base body 41. The first detection element SE1 is supported by the first support portion 31S. The first gap g1 is provided between the base body 41 and the first detection element SE1.

The first electrical resistance of the first resistance member 11 (first detection member SM1) can be changed according to the detection object around the first detection element SE1. For example, by supplying a current to the first conductive member CM1, the temperature of the first detection element SE1 rises, and then the temperature drops. The degree of heat dissipation of the first detection element SE1 varies depending on the detection object. For example, the temperature of the first detection element SE1 changes depending on the detection object. The characteristics of the first detection member SM1 (for example, the first resistance member 11) change with the change in temperature. For example, the first electrical resistance of the first resistance member 11 depends on the detection object. The detection object can be detected by detecting a value based on the first electrical resistance. The sensor 110 is a resistance detection type sensor.

The first reference electrical resistance of the first reference resistance member SR1 does not substantially change according to the detection object. Alternatively, a first rate of change of the first electrical resistance with respect to the change of the detection object is higher than a first reference rate of change of the first reference electrical resistance with respect to the change of the detection object.

In the embodiments, the detection object may be gas or liquid. The detection object includes, for example, at least one selected from the group consisting of hydrogen, helium, argon, carbon monoxide, carbon dioxide, methane, propane, butane, and sulfur hexafluoride ($SF_6$). The detection object may include, for example, at least one selected from the group consisting of nitrogen, oxygen, ammonia, acetone, and chlorine ($Cl_2$). The detection object may include, for example, alcohol.

Figure 13:
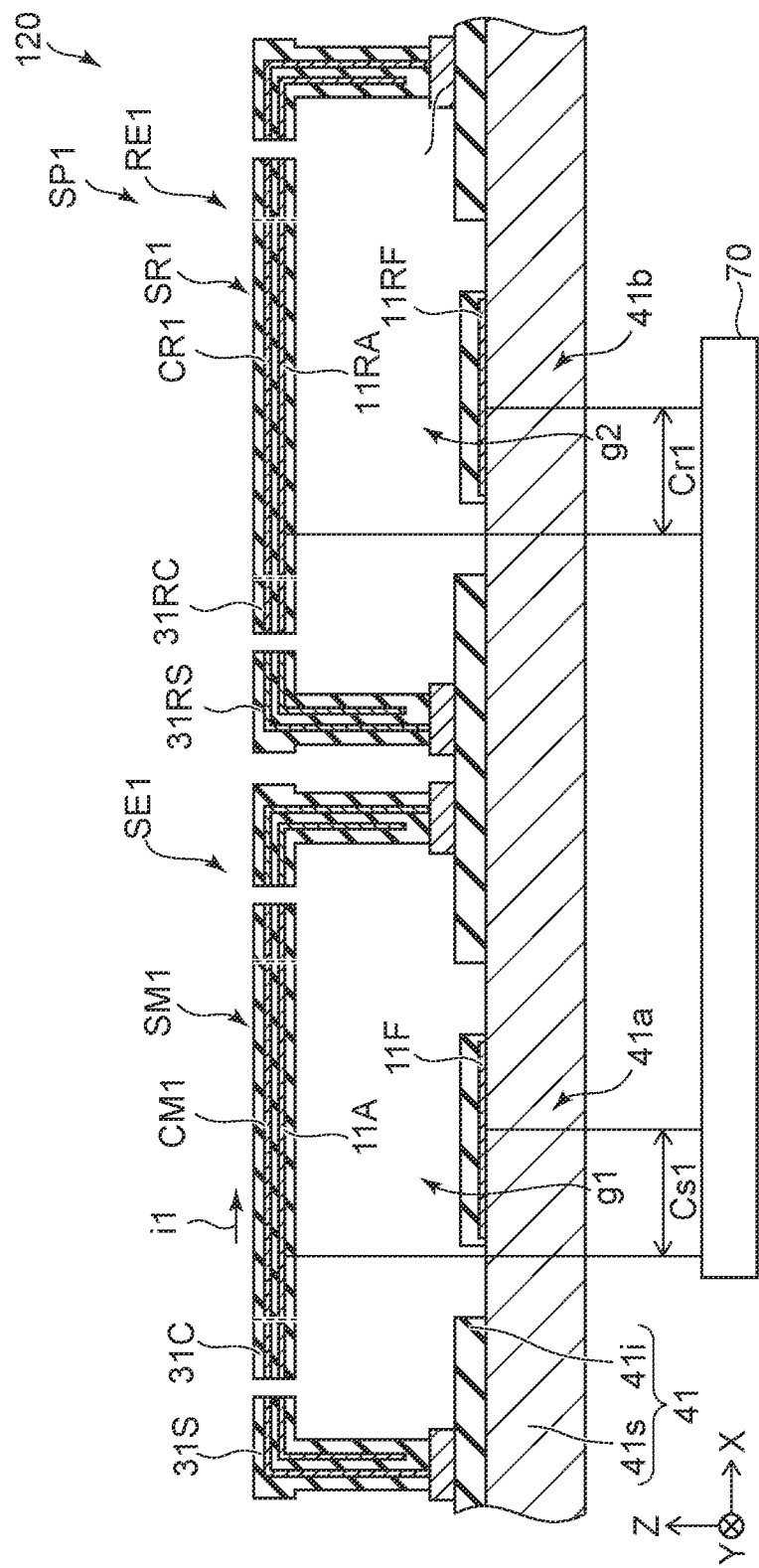
FIG. 13 is a schematic cross-sectional view illustrating a part of a sensor according to the first embodiment.

FIG. 13 is a schematic cross-sectional view illustrating a part of a sensor according to the first embodiment.

FIG. 13 illustrates the first detection portion SP1 in a sensor 120 according to the embodiment. Also in the sensor 120, the first detection portion SP1 includes the first detection element SE1 and the first reference element RE1. The first detection element SE1 includes the first conductive member CM1 and the first detection member SM1. In this example, the first reference element RE1 includes the first reference resistance member SR1 and the first reference conductive member CR1. In the sensor 120, the first detection member SM1 includes a first fixed electrode 11F and a first movable electrode 11A. The first reference element RE1 includes a first fixed reference electrode 11RF and a first movable reference electrode 11RA. The configuration of the sensor 120 except for this may be the same as the configuration of the sensor 110.

The sensor 120 is a capacitance detection type sensor. The sensor 120 detects a first capacitance Cs1 between the first fixed electrode 11F and the first movable electrode 11A. A first reference capacitance Cr1 between the first fixed reference electrode 11RF and the first movable reference electrode 11RA is detected. A difference between the first capacitance Cs1 and the first reference capacitance Cr1 is derived.

For example, in the first detection element SE1, the detection object is taken into a layer included in the first detection element SE1. As a result, the layers included in the first detection element SE1 is deformed. As the distance between the first fixed electrode 11F and the first movable electrode 11A changes, the first capacitance Cs1 changes. By supplying a current to the first conductive member CM1 included in the first detection element SE1, the temperature of the first detection element SE1 rises, and the degree to which the detection object is taken in increases, for example.

On the other hand, the temperature of the first reference element RE1 does not rise. The shape of the first reference element RE1 does not substantially change even if the detection object changes. Therefore, the first reference capacitance Cr1 does not substantially change even if the detection object changes. By detecting the difference between the first capacitance Cs1 and the first reference capacitance Cr1, the detection object can be detected with high accuracy.

In the sensor 120, the first detection value Vs1 is based on the difference between the first capacitance Cs1 between the first fixed electrode 11F and the first movable electrode 11A when the first current i1 is supplied to the first conductive member CM1, and the first reference capacitance Cr1 between the first fixed reference electrode 11RF and the first movable reference electrode 11RA.

The first capacitance Cs1 can be changed according to the detection object around the first detection element SE1. The first reference capacitance Cr1 does not change depending on the detection object. Alternatively, the first rate of change of the first capacitance Cs1 with respect to the change of the detection object is higher than the first reference rate of change of the first reference capacitance Cr1 with respect to the change of the detection object.

Second Embodiment

The second embodiment relates to a sensor system. The sensor system 210 according to the embodiment includes the sensor according to the first embodiment (e.g., the sensor 110 or the sensor 120) and the control circuit 73 (see FIG. 1). The control circuit 73 is configured to control the circuit portion 70 (for example, the switch circuit 75). The control circuit 73 may be configured to control at least one of the detection circuit 71 or the evaluation circuit 72. The control circuit 73 may be configured to control at least one of the conductive member power source Vh or the detection power source Vs.

The control circuit 73 may be provided at a location different from the location where the detection device 10 and the switch circuit 75 are provided. The control circuit 73 may be configured to communicate with the sensor according to the first embodiment by any wired or wireless method. The control circuit 73 may include a computer.

Embodiments may include the following configurations (e.g., technical proposals).

Configuration 1

A sensor, comprising:
a detection device including a first detection portion and a second detection portion; and
a circuit portion,
the first detection portion including a first detection element, the first detection element including a first conductive member and a first detection member,
the second detection portion including a second detection element, the second detection element including a second conductive member and a second detection member,
the circuit portion being configured to execute a first detection portion operation for outputting a first detection result corresponding to a first detection value based on the first detection member when a first current is supplied to the first conductive member,
in a case where a first evaluation value is not within a first range, the circuit portion being configured to execute a second detection portion operation by the second detection portion,
the first evaluation value including at least one of a value based on the first detection member when the first current is not supplied to the first conductive member or a value based on the first conductive member when the first current is substantially not supplied to the first conductive member.

Configuration 2

The sensor according to Configuration 1, wherein the circuit portion is configured to further execute the first detection portion operation when the first evaluation value is within the first range.

Configuration 3

The sensor according to Configuration 1 or 2, wherein
in the second detection portion operation, the circuit portion is configured to output a second detection result corresponding to a second detection value based on the second detection member when a second current is supplied to the second conductive member,
in a case where the second evaluation value is not within a second range, the circuit portion does not further execute the second detection portion operation, and
the second evaluation value includes at least one of a value based on the second detection member when the second current is not supplied to the second conductive member or a value based on the second conductive member when the second current is substantially not supplied to the second conductive member.

Configuration 4

The sensor according to Configuration 3, wherein the circuit portion is configured to output information including a warning in a case where the second evaluation value is not within the second range.

Configuration 5

The sensor according to Configuration 3 or 4, wherein the circuit portion is configured to further execute the second detection portion operation when the second evaluation value is within the second range.

Configuration 6

The sensor according to any one of Configurations 3 to 5, wherein
the circuit portion includes a switch circuit,
the switch circuit is configured to switch between supplying the first current to the first conductive member and not supplying the first current to the first conductive member, and
the switch circuit is configured to switch between supplying the second current to the second conductive member and not supplying the second current to the second conductive member.

Configuration 7

The sensor according to Configuration 6, wherein
the circuit portion further includes a detection circuit,
the detection circuit is configured to output the first detection result, and
the detection circuit is configured to output the second detection result.

Configuration 8

The sensor according to Configuration 7, wherein
the circuit portion further includes an evaluation circuit,
the evaluation circuit is configured to output a first evaluation result as to whether or not the first evaluation value is within the first range, and the evaluation circuit is configured to output a second evaluation result as to whether the second evaluation value is within the second range.

Configuration 9

The sensor according to Configuration 8, wherein the circuit portion further includes a control circuit, and the control circuit is configured to control the switch circuit.

Configuration 10

The sensor according to any one of Configurations 1 to 8, wherein
the first detection member includes a first resistance member, and
the first detection result is a first electrical resistance of the first resistance member.

Configuration 11

The sensor according to Configuration 7, wherein
the first detection portion includes a first reference element,
the first reference element includes a first reference resistance member,
the first detection member includes a first resistance member, and
the first detection value is based on a difference between a first electrical resistance of the first resistance member when the first current is supplied to the first conductive member and a first reference electrical resistance of the first reference resistance member.

Configuration 12

The sensor according to Configuration 11, wherein
the first detection portion further includes
a base body, and
a first support portion fixed to the base body,
the first detection element is supported by the first support portion, and
a first gap is provided between the base body and the first detection element.

Configuration 13

The sensor according to Configuration 12, wherein the first electrical resistance is configured to change depending on a detection object around the first detection element.

Configuration 14

The sensor according to Configuration 13, wherein
the first reference electrical resistance does not change depending on the detection object, or
a first rate of a change of the first electrical resistance with respect to a change of the detection object is higher than a first reference rate of a change of the first reference electrical resistance with respect to the change of the detection object.

Configuration 15

The sensor according to Configuration 8, wherein
the first detection member includes a first fixed electrode and a first movable electrode,
the first detection portion includes a first reference element,
the first reference element includes a first fixed reference electrode and a first movable reference electrode, and
the first detection value is based on a difference between
a first capacitance between the first fixed electrode and the first movable electrode when the first current is supplied to the first conductive member and a first reference capacitance between the first fixed reference electrode and the first movable reference electrode.

Configuration 16

The sensor according to Configuration 15, wherein
the first capacitance is configured to change depending on a detection object around the first detection element,
the first reference capacitance does not change depending on the detection object, or
a first change rate of the first capacitance with respect to a change of the detection object is higher than a first reference change rate of the first reference capacitance with respect to the change of the detection object.

Configuration 17

The sensor according to any one of Configurations 13, 14 and 16, wherein the detection object includes at least one selected from the group consisting of carbon dioxide, carbon monoxide, hydrogen, helium, argon, carbon monoxide, carbon dioxide, methane, propane, butane, sulfur hexafluoride, nitrogen, oxygen, ammonia, acetone, chlorine, and alcohol.

Configuration 18

The sensor according to Configuration 2, wherein when the first detection portion operation is further performed, the circuit portion is configured to adjust at least one of the first current or a derivation condition of the first detection value based on the first evaluation value.

Configuration 19

A sensor system, comprising:
the sensor according to Configuration 8; and
a control circuit,
the control circuit being configured to control the switch circuit.

Configuration 20

A sensor system, comprising:
the sensor according to any one of Configurations 1 to 8 and 10 to 18; and
a control circuit configured to control the circuit portion.

According to the embodiments, it is possible to provide a sensor and a sensor system capable of stable detection.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors and sensor systems such as bae bodies, detection portions, circuit portions, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and sensor systems practicable by an appropriate design modification by one skilled in the art based on the sensors and sensor systems described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
   a detection device including a first detection portion and a second detection portion; and
   a circuit portion,
   the first detection portion including a first detection element, the first detection element including a first conductive member and a first detection member,
   the second detection portion including a second detection element, the second detection element including a second conductive member and a second detection member,
   the circuit portion being configured to execute a first detection portion operation for outputting a first detection result corresponding to a first detection value based on the first detection member when a first current is supplied to the first conductive member,
   in a case where a first evaluation value is not within a first range, the circuit portion being configured to execute a second detection portion operation by the second detection portion,
   the first evaluation value including at least one of a value based on the first detection member when the first current is not supplied to the first conductive member or a value based on the first conductive member when the first current is substantially not supplied to the first conductive member.

2. The sensor according to claim 1, wherein the circuit portion is configured to further execute the first detection portion operation when the first evaluation value is within the first range.

3. The sensor according to claim 2, wherein when the first detection portion operation is further performed, the circuit portion is configured to adjust at least one of the first current or a derivation condition of the first detection value based on the first evaluation value.

4. The sensor according to claim 1, wherein
   in the second detection portion operation, the circuit portion is configured to output a second detection result corresponding to a second detection value based on the second detection member when a second current is supplied to the second conductive member,
   in a case where the second evaluation value is not within a second range, the circuit portion does not further execute the second detection portion operation, and
   the second evaluation value includes at least one of a value based on the second detection member when the second current is not supplied to the second conductive member or a value based on the second conductive member when the second current is substantially not supplied to the second conductive member.

5. The sensor according to claim 4, wherein the circuit portion is configured to output information including a warning in a case where the second evaluation value is not within the second range.

6. The sensor according to claim 4, wherein the circuit portion is configured to further execute the second detection portion operation when the second evaluation value is within the second range.

7. The sensor according to claim 4, wherein
   the circuit portion includes a switch circuit,
   the switch circuit is configured to switch between supplying the first current to the first conductive member and not supplying the first current to the first conductive member, and
   the switch circuit is configured to switch between supplying the second current to the second conductive member and not supplying the second current to the second conductive member.

8. The sensor according to claim 7, wherein
   the circuit portion further includes a detection circuit,
   the detection circuit is configured to output the first detection result, and
   the detection circuit is configured to output the second detection result.

9. The sensor according to claim 8, wherein
   the circuit portion further includes an evaluation circuit,
   the evaluation circuit is configured to output a first evaluation result as to whether or not the first evaluation value is within the first range, and
   the evaluation circuit is configured to output a second evaluation result as to whether the second evaluation value is within the second range.

10. The sensor according to claim 9, wherein
    the circuit portion further includes a control circuit, and
    the control circuit is configured to control the switch circuit.

11. The sensor according to claim 9, wherein
    the first detection member includes a first fixed electrode and a first movable electrode,
    the first detection portion includes a first reference element,
    the first reference element includes a first fixed reference electrode and a first movable reference electrode, and
    the first detection value is based on a difference between a first capacitance between the first fixed electrode and the first movable electrode when the first current is supplied to the first conductive member and a first reference capacitance between the first fixed reference electrode and the first movable reference electrode.

12. The sensor according to claim 11, wherein
    the first capacitance is configured to change depending on a detection object around the first detection element,
    the first reference capacitance does not change depending on the detection object, or
    a first change rate of the first capacitance with respect to a change of the detection object is higher than a first reference change rate of the first reference capacitance with respect to the change of the detection object.

13. A sensor system, comprising:
    the sensor according to claim 9; and
    a control circuit,
    the control circuit being configured to control the switch circuit.

14. The sensor according to claim 8, wherein
    the first detection portion includes a first reference element,
    the first reference element includes a first reference resistance member,
    the first detection member includes a first resistance member, and
    the first detection value is based on a difference between a first electrical resistance of the first resistance member when the first current is supplied to the first conductive member and a first reference electrical resistance of the first reference resistance member.

15. The sensor according to claim 14, wherein
the first detection portion further includes
a base body, and
a first support portion fixed to the base body,
the first detection element is supported by the first support portion, and
a first gap is provided between the base body and the first detection element.

16. The sensor according to claim 15, wherein the first electrical resistance is configured to change depending on a detection object around the first detection element.

17. The sensor according to claim 16, wherein
the first reference electrical resistance does not change depending on the detection object, or
a first rate of a change of the first electrical resistance with respect to a change of the detection object is higher than a first reference rate of a change of the first reference electrical resistance with respect to the change of the detection object.

18. The sensor according to claim 16, wherein the detection object includes at least one selected from the group consisting of carbon dioxide, carbon monoxide, hydrogen, helium, argon, carbon monoxide, carbon dioxide, methane, propane, butane, sulfur hexafluoride, nitrogen, oxygen, ammonia, acetone, chlorine, and alcohol.

19. The sensor according to claim 1, wherein
the first detection member includes a first resistance member, and
the first detection result is a first electrical resistance of the first resistance member.

20. A sensor system, comprising:
the sensor according to claim 1; and
a control circuit configured to control the circuit portion.

* * * * *